(12) United States Patent
Stokes et al.

(10) Patent No.: US 6,611,273 B2
(45) Date of Patent: Aug. 26, 2003

(54) METHOD AND DATA ARRANGEMENT FOR ENCAPSULATING SIGNED OVER-RANGED COLOR IMAGE DATA TO ACCOMMODATE IN-RANGE FILE FORMATS

(75) Inventors: Michael D. Stokes, Redmond, WA (US); Gilman K. Wong, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 330 days.

(21) Appl. No.: 09/790,930

(22) Filed: Feb. 22, 2001

(65) Prior Publication Data

US 2001/0033286 A1 Oct. 25, 2001

Related U.S. Application Data

(60) Provisional application No. 60/185,033, filed on Feb. 25, 2000.

(51) Int. Cl.[7] .................................................. G09G 5/02
(52) U.S. Cl. ...................... 345/590; 345/591; 345/549
(58) Field of Search ................................. 345/590, 591, 345/600, 530, 544, 545, 549

(56) References Cited

U.S. PATENT DOCUMENTS 5,838,334 A * 11/1998 Dye ............................ 345/531
5,949,967 A * 9/1999 Spaulding et al. .......... 345/590

* cited by examiner

*Primary Examiner*—Matthew Luu
(74) *Attorney, Agent, or Firm*—Leydig, Voit & Mayer, Ltd.

(57) ABSTRACT

A new method and data encapsulation arrangement are disclosed for over-ranging color image data. The resulting data storage format renders color image data sets encoded in the over-ranging format compatible with in-range color image systems. Thus, color images including over-ranging portions will be readable by legacy systems that handle only in-range color data.

The new arrangement of the color image data storage comprises a file header segment describing contents of a color image file. The new arrangement also includes an image data segment comprising digital image data representing a set of color image elements encoded in a signed over-ranged color space. A multi-partitioned color image bitmap data segment is created.

A first partition in the multi-partitioned bitmap data segment includes image data corresponding to a first color image data word portion associated with an in-range color space. A second partition in the multi-partitioned bitmap data segment includes image data corresponding to a second color image data word portion associated with an over-ranging color space. The second partition may optionally include additional precision bits that are concatenated with the lowest precision in-range color channel data of the first partition.

31 Claims, 5 Drawing Sheets

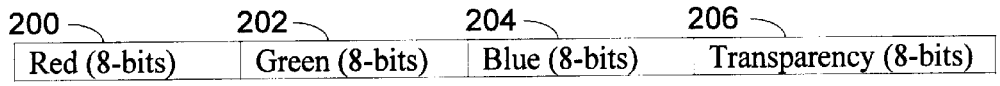
FIG. 3
(8 bit format sRGB32)
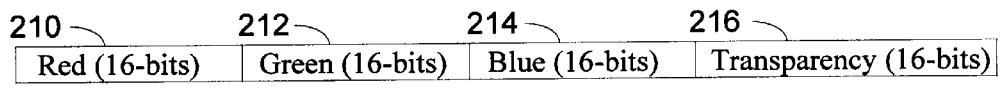
FIG. 4
(16 bit format scRGB64)
| Bit | Value encoded | Color Image Data Bit Logical Storage Position | |
|---|---|---|---|
| | | Dual Partition | Triple partition |
| 15 | Sign bit (+ or -) | 2 | 2 |
| 14 | Factor doubling range from (-2 to +2) to (-4 to + 4) | 2 | 2 |
| 13 | Factor doubling range from (-1 to +1) to (-2 to +2) | 2 | 2 |
| 12 | (MSB sRGB32) | 1 | 1 |
| 11 | | 1 | 1 |
| 10 | | 1 | 1 |
| 9 | | 1 | 1 |
| 8 | | 1 | 1 |
| 7 | | 1 | 1 |
| 6 | | 1 | 1 |
| 5 | (LSB sRGB32) | 1 | 1 |
| 4 | | 2 | 3 |
| 3 | | 2 | 3 |
| 2 | | 2 | 3 |
| 1 | | 2 | 3 |
| 0 | Least significant bit | 2 | 3 |
FIG. 5

METHOD AND DATA ARRANGEMENT FOR ENCAPSULATING SIGNED OVER-RANGED COLOR IMAGE DATA TO ACCOMMODATE IN-RANGE FILE FORMATS

CROSS-REFERENCE TO RELATED APPLICATION

This application claims benefit of U.S. Provisional Patent Application No. 60/185,033, filed Feb. 25, 2000, the contents of which are expressly incorporated herein by reference in their entirety.

AREA OF THE INVENTION

The present invention generally relates to the area of digital color image encoding schemes, and more particularly to systems utilized to store digital data corresponding to color images according to particular attribute (e.g., color) data encoding formats.

BACKGROUND OF THE INVENTION

As will be appreciated by those skilled in the art, there are multiple ways in which to encode image data for a digital image. A simple form of image data storage is monochromatic. In such instance individual picture image elements are defined by a single radiance (brightness) level.

However, as various elements of computer technology advanced, including displays, memory, and processors, color displays became commercially viable and a number of color image digital data encoding schemes have been adopted and/or proposed. Currently a very large number of application and systems are programmed to utilize an in range 8-bit RGB digital color image data encoding scheme.

Turning briefly to FIG. 1, a two-dimensional space represents the components of a three-dimensional CIE Yxy color image space. A first closed shape 10 represents the color space viewable by a normal human eye. A triangle 12, completely enclosed within the boundaries of closed shape 10, represents the extent of the color space represented by in-range sRGB color encoding schemes.

As used herein, the term "in-range" refers to values falling within the range of values expected in a legacy color encoding scheme. The lowest value in the range typically corresponds to the minimum intensity for a color channel and the highest value corresponds to the maximum intensity value for the color channel. For example, in the context of the sRGB color encoding scheme, in-range values are equal to, or greater than, zero and equal to, or less than, one.

It is noted that the individual values represented in the in-range sRGB color encoding scheme actually occupy discrete points within the region bounded by the triangle 12. As a larger number of bits are used to digitally encode a color image within in-range color encoding schemes, the precision of color, rather than the range of color, increases. For example, an in-range 8-bit sRGB color encoding scheme (IEC 61966-2-1) supports 256 levels of brightness for each of the three color channels. An in-range 10-bit sRGB scheme supports four times as many levels. However, the lowest and highest values are the same in both the 8-bit and 10-bit sRGB schemes. Thus, the range of color values, demarcated by the triangle 12, is the same for both the 8-bit, 10-bit and even 12-bit in-range sRGB color image encoding schemes.

One of the shortcomings of the in-range sRGB color encoding schemes, as graphically illustrated in FIG. 1, is the inability to store for later production the full range of colors perceived by the human eye. As shown in FIG. 1, the range of colors representing the capabilities of the human eye exceed the range represented by in-range sRGB values. Thus, digitized color images such as digital photographs, represented in one of the in-range sRGB format, may not adequately re-create the range of color present in original images.

Most applications obtain satisfactory image reproduction from in-range digitized sRGB data. However in certain applications such as high quality digital photography, the color range restrictions imposed by in-range sRGB encoding are undesirable and unacceptable. In response to the range limitations of in-range sRGB and demand for better colorization and/or original color re-creation from stored digital images, an expanded color representation scheme (color space), scRGB (IEC 61966-2-1), has been developed. The image spectrum of scRGB covers an extended color space 14 including the entire human perceivable color space 12, which in turn encompasses the entire in-range sRGB "legacy system" color space. The scRGB color space includes all real world object colors, a dynamic range that is greater than photographic transparency film.

The scRGB color space is an over-ranging color space. As used herein, an over-ranging color space is one that, in addition to in-range digital values (from zero to one) of the above-mentioned in-range sRGB schemes, also supports encoding images by color channel values below zero and/or greater than one. A floating point encoding of the scRGB color space is a signed, over-ranging color space. "Signed," refers to the specific capability to specify negative color values. An integer-based encoding of the scRGB color space is an unsigned, over-ranging color space. The signed portion of signed scRGB color space is handled by a specified offset in the integer-based scRGB color scheme.

Legacy in-range sRGB imaging systems only support in-range color channel values. In-range color channel values are equal to, or greater than, zero and equal to, or less than, one. As a result legacy sRGB imaging systems, which make up the vast majority of imaging systems that will be present for many years, do not support this enhanced color scheme. If presented with an image file stored in the scRGB format, the legacy systems will be unable to read the image data in a manner that renders a useful image in the more limited legacy format (e.g., sRGB). A certain degree of compatibility between scRGB data and in-range formats is desirable.

One way to ensure compatibility with in-range legacy formats, such as sRGB, is to provide all images in two formats. A first version is in the in-range legacy sRGB format. A second version is follows the signed, over-ranging scRGB format. However, image files are notoriously large to begin with. Supporting multiple color spaces by providing multiple versions is a very costly solution.

SUMMARY OF THE INVENTION

The present invention comprises a new method and structure for encapsulating stored over-ranging color image data. The resulting data storage format renders color image data sets encoded in the over-ranging format compatible with in-range color image systems. Thus, color images including over-ranging portions will be readable by legacy systems that handle only in-range color data.

The new arrangement of the color image data storage comprises a file header segment describing contents of a color image file. Such headers come in many forms and depend in large part upon the particular file format (e.g., BMP, TIFF, etc.). The new arrangement also includes an image data segment comprising digital image data representing a set of color image elements encoded in a signed over-ranged color space. The over-ranging portion of the image data cannot be handled by legacy in-range systems, and thus a multi-partitioned color image bitmap data segment is created.

A first partition in the multi-partitioned bitmap data segment includes image data corresponding to a first color image data word portion associated with an in-range color space. The first portion is, by way of example, 8-bit lowest precision in-range color channel data.

A second partition in the multi-partitioned bitmap data segment includes image data corresponding to a second color image data word portion associated with an over-ranging color space. The second portion is, by way of example, a sign bit as well as over-ranging bits providing a range of color values between –4 and 4. The second partition may optionally include additional precision bits that are concatenated with the lowest precision in-range color channel data of the first partition.

Furthermore, the present invention is embodied in encoders that comprise computer instructions for storing over-ranging color channel data in the format summarized above. The present invention is also embodied in decoders that render color images from the multi-partitioned over-ranging color image files including over-ranging color channel data.

BRIEF DESCRIPTION OF THE DRAWINGS

The appended claims set forth the features of the present invention with particularity. The invention, together with its objects and advantages, may be best understood from the following detailed description taken in conjunction with the accompanying drawings of which:

FIG. 3 is a schematic diagram identifying the components of a color picture element arranged according to the sRGB32 format;

FIG. 4 is a schematic diagram identifying the components of a color picture element arranged according to the scRGB64 format;

FIG. 5 is a table describing the various individual bits that make up the 16 bits of color data for each of the color value fields in the scRGB64 format;

DETAILED DESCRIPTION OF ILLUSTRATIVE EMBODIMENTS

The need for a solution to the present problem of maintaining a high level of compatibility with legacy image data software, while developing and providing advanced color image data schemes while, is addressed by the disclosed signed over-ranging color image data encapsulation (storage) scheme. The signed over-ranging color image data words are segmented and stored in at least two partitions. A first partition stores legacy color image data (e.g., in-range highest order/lowest precision bits) in the form expected by legacy image data processors. The remaining color image data bits, including over-range bits and any lower order/higher precision bits are stored in at least a second partition. When needed by an image output/processing system incorporating the scRGB color space arrangement, the data bits from the at least two partitions are retrieved and combined or otherwise processed in accordance with a signed over-ranging scRGB format.

The exemplary embodiment of a signed over-ranging color image data encapsulation scheme, disclosed herein, provides a color image data storage scheme that provides data in a format expected by legacy systems. The additional color image data bits are transparent to the legacy systems, but such additional color image data bits are stored in a well-defined partition that is easily accessed by the color image processing programs for which they are provided.

Figure 2:
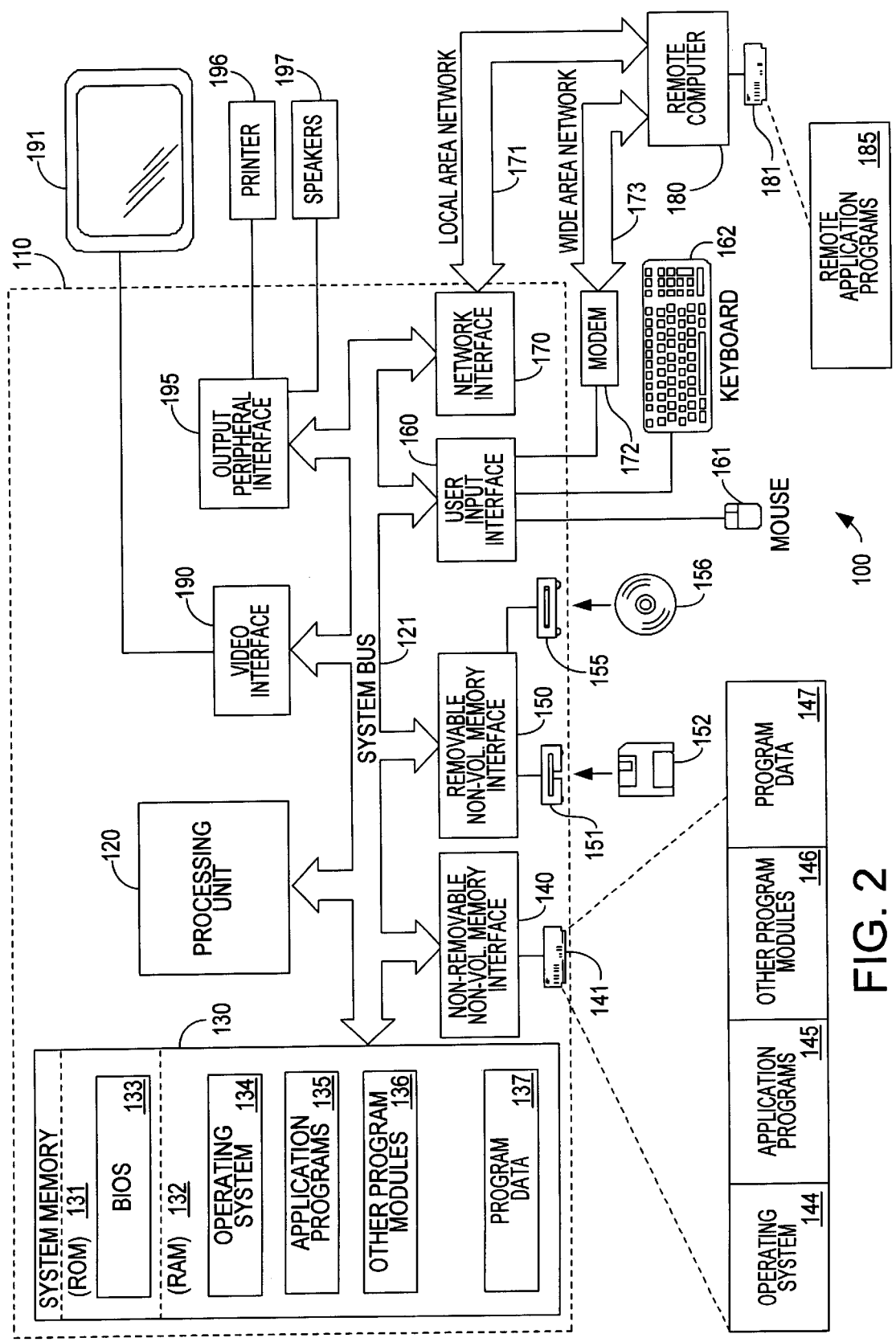
FIG. 2 is a schematic drawing illustratively depicting an exemplary operating environment for carrying out an embodiment of the present invention.

FIG. 2 illustratively depicts an example of a suitable operating environment 100 within which the invention is implemented. More particularly, FIG. 2 illustratively depicts a computer system capable of incorporating and executing the functionality of the multi-partition color image data storage scheme disclosed in detail herein below.

The operating environment 100 is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like, either alone or in combination.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With continued reference to FIG. 2, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

Figure 1:
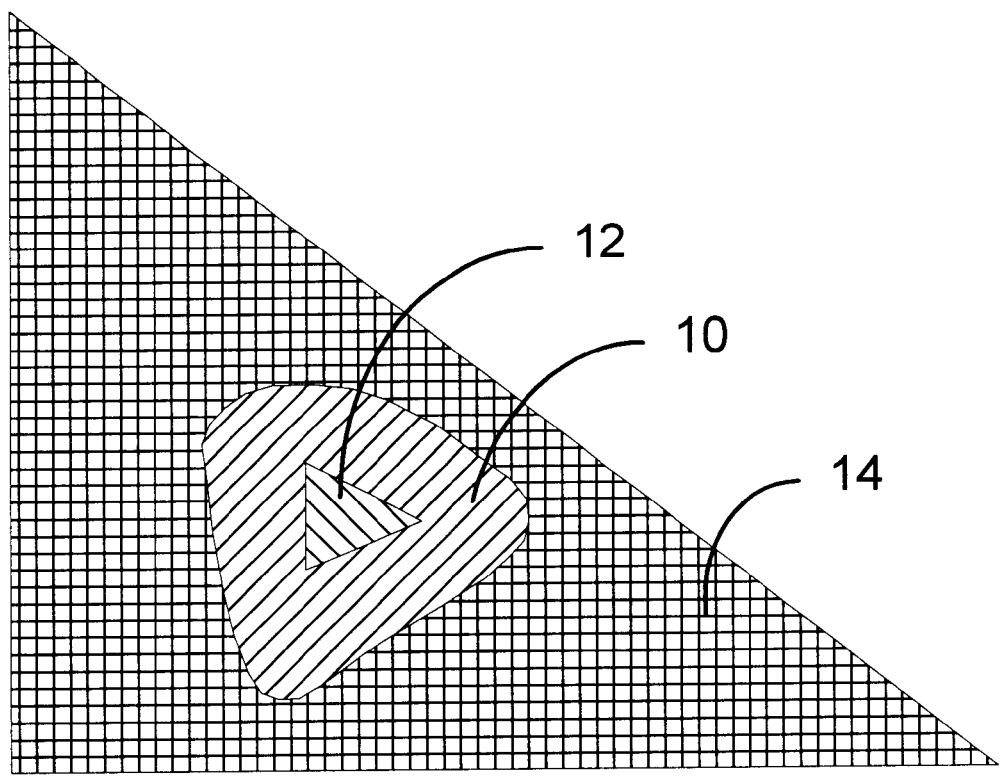
FIG. 1 is a two dimensional graph depicting the extent of the human visual, sRGB, and scRGB color spaces.

Having described exemplary computing environments in which the present invention is carried out, attention is directed to FIG. 3 that schematically depicts the components of a color picture element arranged, for illustrative purposes, according to an sRGB32 format. It is noted however that the present invention is applicable to any signed over-ranging color space data arrangement for which compatibility with in-range color space systems is desired. The sRGB32 format comprises a red intensity value 200, a green intensity value 202 and a blue intensity value 204. The values 200, 202 and 204 are interpreted as in-range values (i.e. less than one and greater or equal to zero). Thus, the highest order bit is interpreted as a value of 128/255 and subsequent bits specify the color value with increasing precision (i.e., 64/255, 32/255, etc.). The three color channel values are combined to render colors within the color space identified in the triangle 12 in FIG. 1. A transparency value 206, also referred to as "alpha," describes how the specified color is blended with other specified color values. At a maximum value, the color value completely replaces the previous color. At a minimum value it would leave the previous color alone. At intermediate values, the color is blended/combined/mixed with a previous color. Such use of the alpha value is well known to those skilled in the art. Each picture element is thus characterized by a 32-bit word. In alternative sRGB encoding schemes, ten, twelve, fourteen, or sixteen bits are used to specify an in-range value with greater precision than the 8 bits used in the sRGB32 scheme.

FIG. 4 is a schematic diagram identifying the components of a color picture element arranged according to the signed, over-ranging floating point scRGB64 format. In the scRGB64 color representation scheme each color channel value 210, 212, and 214 is stored as 16 bits. However, in contrast to the in-range sRGB color space mapping scheme, scRGB includes data bits providing a range of values less than zero and greater than one. A 16-bit transparency value completes the color image data word format depicted in FIG. 4. The arrangement of the 16 bits within each color channel value 210, 212, and 214 is described below in association with FIG. 5.

FIG. 5 depicts the various interpretations of the individual bits making up a single color channel in an scRGB64 color image data word. The highest order bit 220, occupying the bit fifteen position in the color channel value, specifies whether the color value is positive or negative. The two next highest order bits 222, occupying the bit fourteen and thirteen positions in the color channel value, specify a multiplication factor. Bit thirteen increases the range to plus or minus two (taking into consideration the sign bit 15), and bit fourteen facilitates specifying values in a range from plus 4 to minus 4. The highest order bits 220 and 222 in the scRGB64 format thus specify a very different value than the three highest order bits in the above-described in-range sRGB format.

In fact, the first bits that correspond in value to sRGB values are mid-order bits 224 occupying the bit twelve through bit five positions in the color channel value for the scRGB64 format. The mid-order bits 224 substantially correspond to the eight bits of in-range data for each color channel specified in the sRGB32 format. Low order bits 226, occupying the bit zero through bit four positions, specify additional precision for an in-range fraction specified by the mid-order bits 224. Thus a value substantially compatible with and meaningful to legacy sRGB systems can be specified by an scRGB64 color image channel value by specifying zeroes in the highest order bits 220 and 222. As will be explained below, the color image values are sectioned and stored in multiple distinct partitions to provide easy access by legacy color imaging systems, that expect in-range values, to the in-range portions of color image channel data encoded in the over-ranging scRGB (e.g., scRGB64) format.

The columns to the right of the bit value descriptions labeled "dual partition" and "triple partition" identify a logical location where the actual data bits are located in a file (or other container) in accordance with embodiments of a data arrangement and method for storing over-ranging color channel image data that support backward compatibility with legacy in-range color imaging systems. The assignment of particular bits of encoded digital color values to the supplementary (e.g., second and third) partitions can be switched and separated into even more partitions in accordance with alternative embodiments of the invention.

Figure 6:
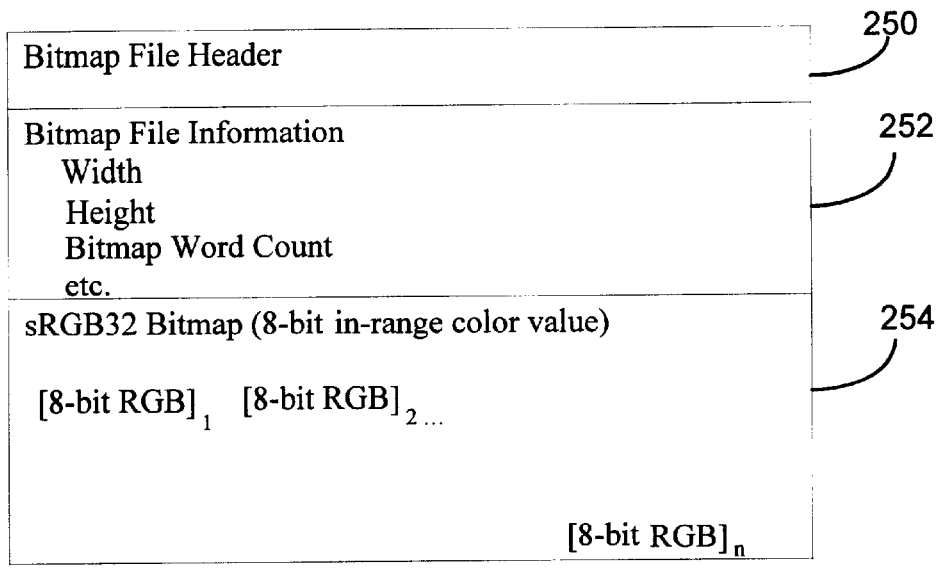
FIG. 6 is a schematic memory map depicting a prior art color image file arrangement.

FIG. 6 is a schematic memory map depicting a prior art color image file arrangement. A typical color image file includes a bitmap file header 250. The file header supports including basic file information including, by way of example, file name, file size, file extension, etc. A bitmap file information section 252 specifies a set of metadata further defining the contents of the image file. By way of example, the bitmap file information section 252 includes image dimensions, the bit count (number of bits used per pixel) as well as a number of other pieces of information that are well known to those skilled in the art. A bitmap 254 comprises data (typically compressed/encoded) corresponding a set of picture element data encoded in the format depicted, by way of example, in FIG. 3. The bitmap 254 thus includes color channel data arranged in groups of 8-bits representing in-range color values. FIG. 6 thus depicts the form of image data expected by legacy in-range imaging system—ones without an awareness or capability to handle over-ranging color space data.

Figure 7:
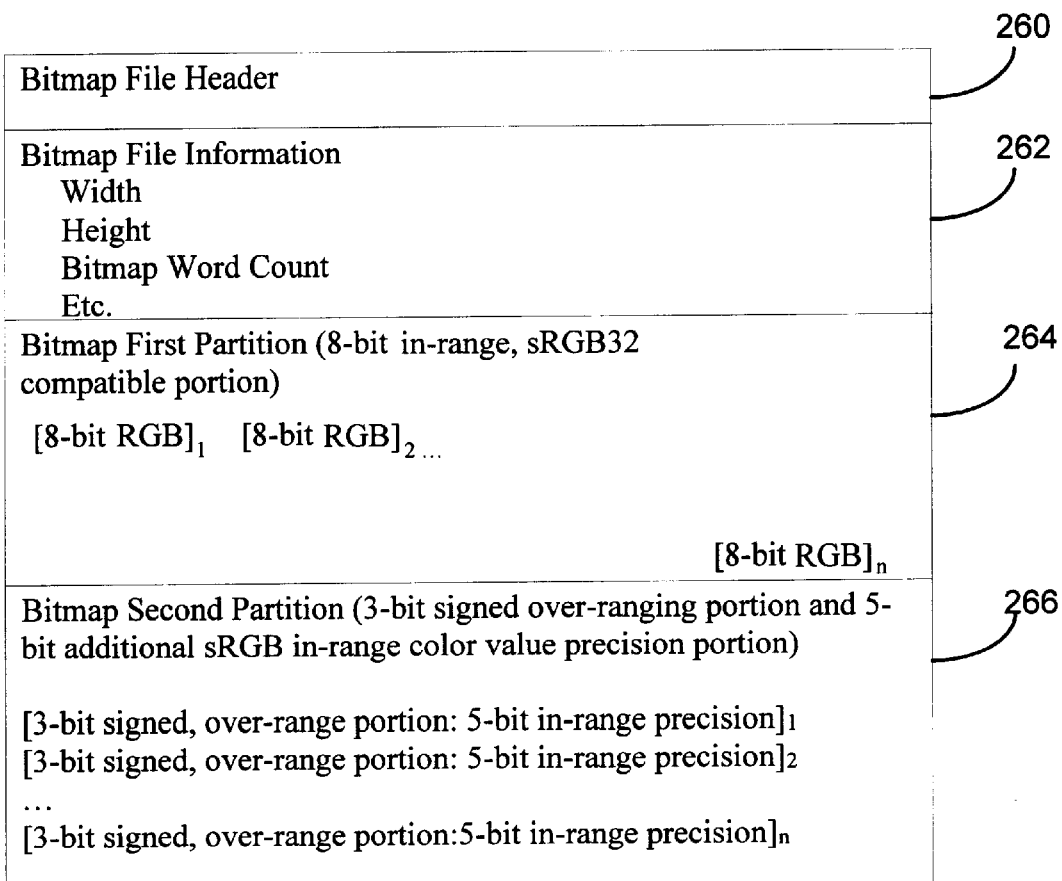
FIG. 7 is a schematic memory map depicting an arrangement of color image data into multiple partitions in accordance with an embodiment of the present invention.

FIG. 7 schematically depicts a memory map describing an arrangement of over-ranging color channel data values into multiple partitions in accordance with an embodiment of the present invention. In the example set forth in FIG. 7, the color channel data values are stored in two distinct partitions (264 and 266). A bitmap file header section 260 and bitmap file information section 262 include file information (e.g., metadata) of the type described above with reference to sections 250 and 252 of the prior art data arrangement. In accordance with an aspect of the present invention, an in-range color image data partition 264 comprises color channel and transparency data of the type expected by in-range color imaging systems. With reference to the color channel data summarized in FIG. 5, mid-order bits 224 are stored within the in-range color image data partition 264. It is noted that while the illustrative embodiment contemplates allocating 8 bits of data per channel, in alternative embodiments more or fewer bits are allocated to specify in-range data in the in-range color image data partition 264.

In accordance with another aspect of the present invention, an over-range color image data partition 266 comprises color channel and transparency data of the type utilized in advanced over-ranging color imaging systems. More particularly, with reference again to FIG. 5, the over-range partition 266 stores at least the highest order bits 220 and 222 of each color channel value. By storing the over-range portion of color channel values in a separate partition, such data can be rendered transparent to legacy imaging systems that are incapable of processing over-range color channel values.

Continuing with the description of the over-range partition 266, additional precision low-order bits 226 of a 16-bit scRGB color channel value are stored with the over-range highest order bits 220 and 222. Such arrangement provides a convenient arrangement wherein 8 bits of data are stored per color channel—3 bits of over-ranging data and 5 bits of additional precision in-range color data. However, such an arrangement is not necessary to practice the present invention. In fact, the over-range and additional precision data can be stored within separate partitions as depicted in FIG. 8.

Figure 8:
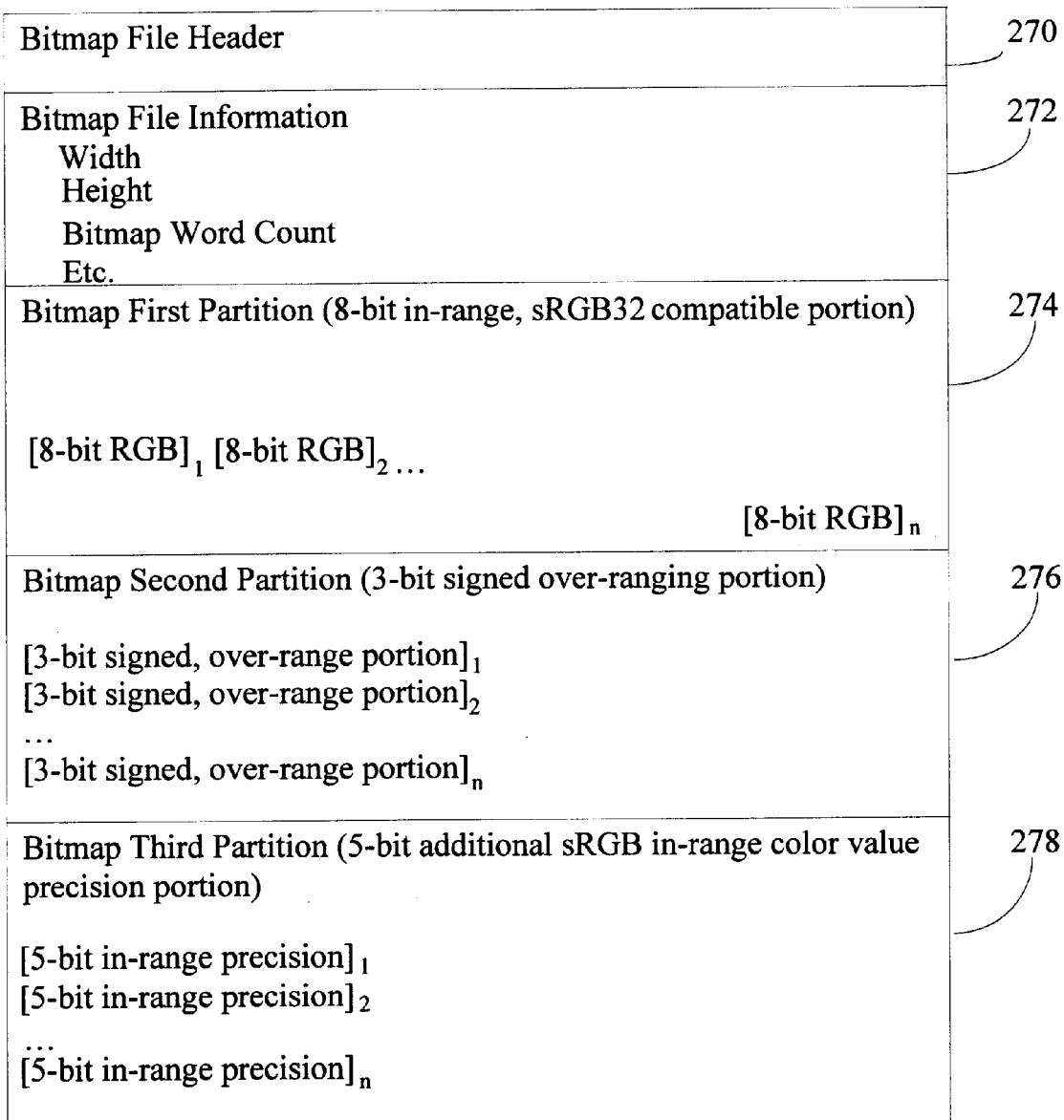
FIG. 8 is a schematic memory map depicting an arrangement of color image data into multiple partitions in accordance with another embodiment of the present invention.

FIG. 8 illustratively depicts a schematic memory map embodying an alternative multi-partitioned color channel data value arrangement facilitating backward compatibility with in-range color imaging systems. The embodiment of FIG. 8 comprises three partitions for storing distinct portions of color channel data values. A bitmap file header section 270 and bitmap file information section 272 include file information (e.g., metadata) of the type described above with reference to sections 250 and 252 of the prior art data arrangement. In accordance with an aspect of the illustrative embodiments of the present invention, an in-range color image data partition 274 comprises color channel and transparency data of the type expected by in-range color imaging systems. With reference to the color channel data summarized in FIG. 5, mid-order bits 224 are stored within the in-range color image data partition 274. It is again noted that in alternative embodiments more or fewer bits (than 8) are allocated to specify in-range data in the in-range color image data partition 274.

In accordance with another aspect of the embodiments of the present invention an over-range color image data partition 276 comprises color channel and transparency data of the type utilized in advanced over-ranging color imaging systems. However, in contrast to the embodiment depicted in FIG. 7, the second partition does not include any in-range color channel data bits. More particularly, with reference again to FIG. 5, the over-range partition 276 stores at least the highest order bits 220 and 222 of each color channel value, but does not include additional in-range precision color channel data bits 226.

By storing the over-range portion of color channel values in a separate partition, such data can be rendered transparent to legacy imaging systems that are incapable of processing over-range color channel values.

Continuing with the description of FIG. 8, a precision in-range data bit partition 278 stores additional precision low-order bits 226 of a 16-bit scRGB color channel value. Such arrangement provides a convenient data decoding arrangement when imaging systems, aware of the multi-partition data bit arrangement scheme, nonetheless wish to selectively retrieve either the over-ranging portion or the additional precision portion of the stored color channel data.

Having described illustrative embodiments of the present invention, it is noted that a color data encoder embodying the present invention will, by way of example, include a first encoder stage that stores in-range lowest precision data bits (e.g., bits 224) into a first partition (e.g., 264 or 274) of a bitmap portion of an image file. A second encoder stage stores at least the over-range bits (e.g., 220, 222) and possibly in-range higher precision bits (e.g., 226) into a second partition (e.g., partition 266 or 276). Finally, a potential third encoder stage stores in-range higher precision data bits (e.g., bits 226) into a third partition (e.g. 278) or second partition (e.g., 266).

Similarly, a color data decoder embodying the present invention will, by way of example, include a first decoder stage that retrieves in-range lowest precision data bits (e.g., bits 224) from the first partition (e.g., partition 274) of a bitmap portion of an image file. A second decoder stage retrieves at least the over-range bits (e.g., 220, 222) and possibly in-range higher precision bits (e.g., 226) from a second partition (e.g., partition 266 or 276). Finally, a third decoder stage retrieves in-range higher precision data bits (e.g., bits 226) from either the second or third partition (e.g., 266 or 278) depending upon the multi-partition color image data bit storage scheme. The decoded data will be arranged in a manner that is presentable to a color image processing system. It is further noted that legacy in-range color image processing systems will not be aware of the second and third partitions. In such cases the data bits stored in the second and third partitions, transparent to the system, are ignored. More importantly, the data in the second and third partitions does not interfere with, or corrupt processing of the in-range color data.

In the above-described encoder arrangement, depicted in FIGS. 5, 7 and/or 8, an 8-bit image is encoded into TIFF or PNG format in a traditional manner using data marked for the first partition (e.g., 264 or 274). A single private tag or chunk is created in the dual partition embodiment using data marked for partition two (e.g., 266). Alternatively two private tags are created with the triple partition data arrangement depicted in FIG. 8 using data marked for partitions two (e.g., 276) and three (e.g., 278). A three partition scheme is simpler to code, but creates a more complex image because there are more partitions to parse to reconstruct the full image data.

Some file formats such as BMP do not support private tags. A BMP file is composed of a file header with pointer to the BMP header information and to the image data. This invention is implemented in BMP files, for example, by either placing the dual partition scheme's (see, FIG. 7) second partition at the end of the in-range image data bits or before the in-range image data bits and appropriately setting the file header pointer to the in-range image data. Some applications assume the 8-bit in-range image data is directly after the BMP header information and some applications assume the end of the file is after the image data, so the flexibility in placement of the second partition data at the front or rear of the 8-bit in-range image data provides support for either situation.

Some file formats such as JFIF and EXIF are based upon a YCC compression space, which is typically an in-range space. The YCC compression space can be handled by providing either an extra matrix to convert the signed over-ranging data in the second partition into YCC with an offset to eliminate the signed color value issue or by separating the data prior to compression and storing the contents of the second partition as a private tag (or metadata). The contents of the second partition (stored as a private tag/metadata) can then be recombined by JPEG decoders that recognize this private tag and ignored by others.

Illustrative embodiments of the present invention and certain variations thereof have been provided in the Figures and accompanying written description. The disclosed method and memory arrangement for representing over-range color channel image data facilitates backward compatibility with legacy in-range color imaging systems in files that support advanced, over-range color spaces. The present invention is not intended to be limited to the disclosed embodiments. Rather the present invention is intended to cover the disclosed embodiments as well as others falling within the scope and spirit of the invention to the fullest extent permitted in view of this disclosure and the inventions defined by the claims appended herein below.

What is claimed is:

1. A color image data storage arrangement for encapsulating over-ranging color image data in a format rendering color image data sets encoded in the over-ranging format compatible with in-range color image systems, the color image data storage arrangement comprising:

a file header segment describing contents of a color image file; and an image data segment comprising digital image data representing a set of color image elements encoded in a signed over-ranged color space, the image data segment comprising:

a first partition comprising image data corresponding to a first color image data word portion associated with an in-range color space; and a second partition comprising image data corresponding to a second color image data word portion associated with an over-ranging color space.

2. The color image data storage arrangement of claim 1 wherein the first color image data word portion comprises lowest precision, in-range color data.

3. The color image data storage arrangement of claim 2 wherein the lowest precision in-range color data corresponds to in-range 8-bit sRGB data.

4. The color image data storage arrangement of claim 2 wherein the second partition further comprises image data corresponding to a third color image data word portion associated with the in-range color space, the third color image data word portion supplementing a precision of in-range color data in the first color image data word portion.

5. The color image data storage arrangement of claim 1 wherein the second color image data word portion comprises a sign bit.

6. The color image data storage arrangement of claim 1 wherein the file header segment includes a second partition start address value corresponding to a logical memory location differing from a first partition start address.

7. The color image data storage arrangement of claim 1 wherein image file data segment further comprises a third partition comprising image data corresponding to a third color image data word portion associated with the in-range color space, the third color image data word portion supplementing a precision of in-range color data in the first color image data word portion.

8. A method for arranging image data in an over-ranging color space in a format rendering color image data sets encoded in the over-ranging format compatible with in-range color image systems, the method comprising the steps of:

formulating a file header segment describing contents of a color image file; and creating an image data segment comprising digital image data representing a set of color image elements encoded in a signed over-ranged color space, the creating an image data segment comprising the sub-steps of:

first storing image data corresponding to a first color image data word portion associated with an in-range color space within a first partition; and second storing image data corresponding to a second color image data word portion associated with an over-ranging color space in a second partition.

9. The method of claim 8 wherein the first color image data word portion comprises lowest precision, in-range color data.

10. The method of claim 9 wherein the lowest precision in-range color data corresponds to in-range 8-bit sRGB data.

11. The method of claim 9 wherein the second partition further comprises image data corresponding to a third color image data word portion associated with the in-range color space, the third color image data word portion supplementing a precision of in-range color data in the first color image data word portion.

12. The method of claim 8 wherein the second color image data word portion comprises a sign bit.

13. The method of claim 8 wherein the file header segment includes a second partition start address value corresponding to a logical memory location differing from a first partition start address.

14. The method of claim 8 further comprising the step of:

third storing image data corresponding to a third color image data word portion associated with the in-range color space in a third partition, wherein the third color image data word portion supplements a precision of in-range color data in the first color image data word portion.

15. A color image data encoder for arranging image data in an over-ranging color space in a format rendering color image data sets encoded in the over-ranging format compatible with in-range color image systems, the color image data encoder comprising:

a first routine for formulating a file header segment describing contents of a color image file; and a second routine for creating an image data segment comprising digital image data representing a set of color image elements encoded in a signed over-ranged color space, the creating an image data segment comprising:

first storing image data corresponding to a first color image data word portion associated with an in-range color space within a first partition; and second storing image data corresponding to a second color image data word portion associated with an over-ranging color space in a second partition.

16. The encoder of claim 15 wherein the first color image data word portion comprises lowest precision, in-range color data.

17. The encoder of claim 16 wherein the second partition further comprises image data corresponding to a third color image data word portion associated with the in-range color space, the third color image data word portion supplementing a precision of in-range color data in the first color image data word portion.

18. The encoder of claim 15 wherein the second color image data word portion comprises a sign bit.

19. The encoder of claim 15 wherein the file header segment includes a second partition start address value corresponding to a logical memory location differing from a first partition start address.

20. A decoder for rendering color image data from a color image file comprising image data encoded in an over-ranging color space, in a format rendering color image data sets encoded in the over-ranging format compatible with in-range color image systems, the decoder comprising:

a first parsing routine for decoding a file header segment describing contents of a color image file; and a second parsing routine for decoding an image data segment comprising digital image data representing a set of color image elements encoded in a signed over-ranged color space, the decoding an image data segment comprising:

first retrieving image data corresponding to a first color image data word portion associated with an in-range color space within a first partition; and second retrieving image data corresponding to a second color image data word portion associated with an over-ranging color space in a second partition.

21. The decoder of claim 20 wherein the first color image data word portion comprises lowest precision, in-range color data.

22. The decoder of claim 21 wherein the second partition further comprises image data corresponding to a third color image data word portion associated with the in-range color space, the third color image data word portion supplementing a precision of in-range color data in the first color image data word portion.

23. The decoder of claim 20 wherein the second color image data word portion comprises a sign bit.

24. The decoder of claim 20 wherein the file header segment includes a second partition start address value corresponding to a logical memory location differing from a first partition start address.

25. A computer-readable medium storing computer executable instructions to perform steps for arranging image data in an over-ranging color space in a format rendering color image data sets encoded in the over-ranging format compatible with in-range color image systems, the steps comprising:
  formulating a file header segment describing contents of a color image file; and
  creating an image data segment comprising digital image data representing a set of color image elements encoded in a signed over-ranged color space, the creating an image data segment comprising the sub-steps of:
    first storing image data corresponding to a first color image data word portion associated with an in-range color space within a first partition; and
    second storing image data corresponding to a second color image data word portion associated with an over-ranging color space in a second partition.

26. The computer-readable medium of claim 25 wherein the first color image data word portion comprises lowest precision, in-range color data.

27. The computer-readable medium of claim 26 wherein the lowest precision in-range color data corresponds to in-range 8-bit sRGB data.

28. The computer-readable medium of claim 26 wherein the second partition further comprises image data corresponding to a third color image data word portion associated with the in-range color space, the third color image data word portion supplementing a precision of in-range color data in the first color image data word portion.

29. The computer-readable medium of claim 25 wherein the second color image data word portion comprises a sign bit.

30. The computer-readable medium of claim 25 wherein the file header segment includes a second partition start address value corresponding to a logical memory location differing from a first partition start address.

31. The computer-readable medium of claim 25 further comprising computer-executable instructions for performing the step of:
  third storing image data corresponding to a third color image data word portion associated with the in-range color space in a third partition, wherein the third color image data word portion supplements a precision of in-range color data in the first color image data word portion.

* * * * *